Sept. 2, 1924.                                               1,507,173
B. HASKELL
RAILWAY BRAKE LEVER CONNECTION
Filed Dec. 5, 1923
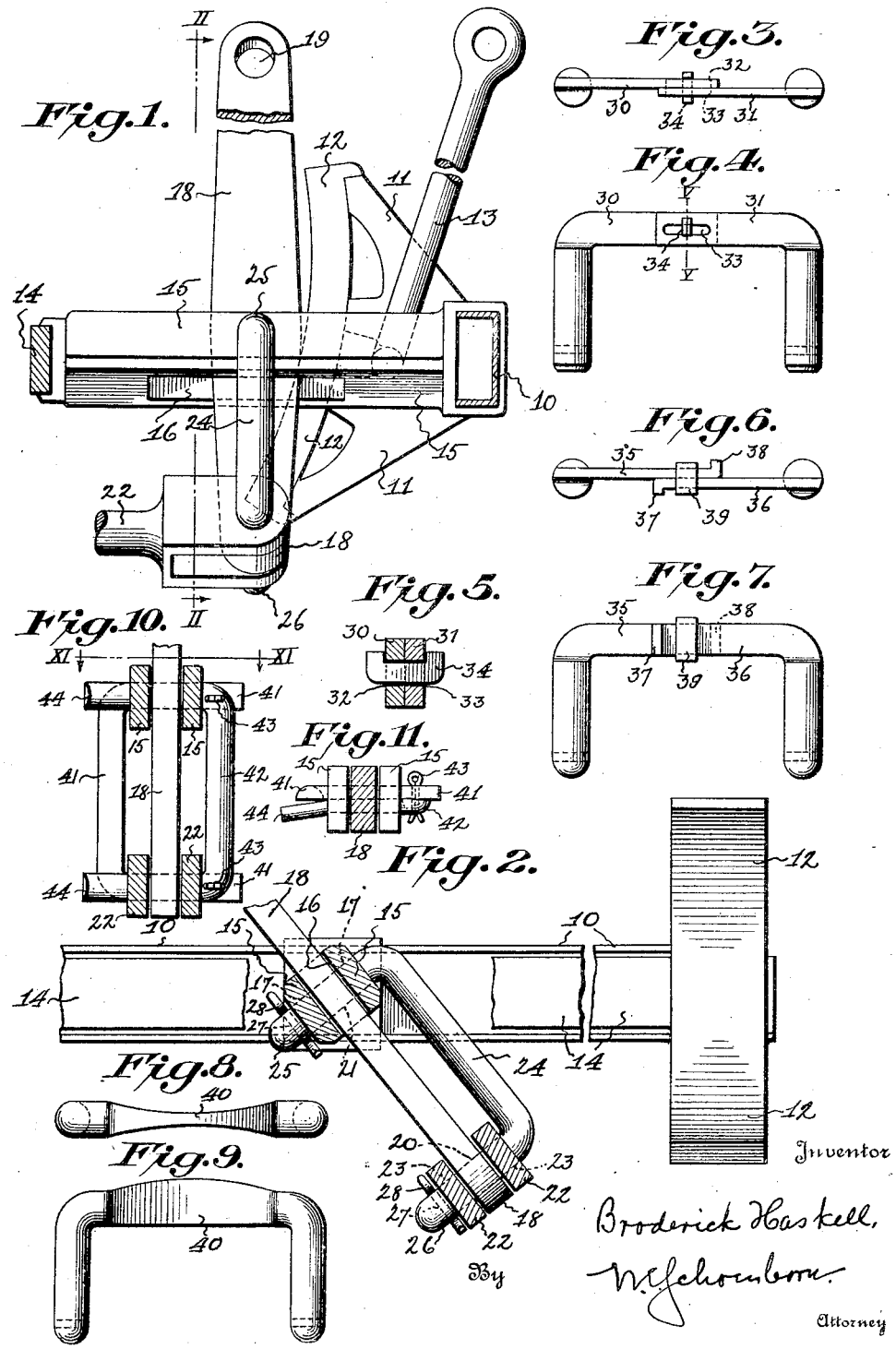

Patented Sept. 2, 1924.

1,507,173

UNITED STATES PATENT OFFICE.

BRODERICK HASKELL, OF FRANKLIN, PENNSYLVANIA.

RAILWAY-BRAKE-LEVER CONNECTION.

Application filed December 5, 1923. Serial No. 678,732.

*To all whom it may concern:*

Be it known that I, BRODERICK HASKELL, a citizen of the United States, residing at Franklin, in the county of Venango and State of Pennsylvania, have invented certain new and useful Improvements in Railway-Brake-Lever Connections, of which the following is a specification.

This invention relates to brakes for railway cars, and more particularly to the means for connecting and securely attaching the bottom or brake connecting rod to the brake levers, and at the same time firmly and pivotally attaching said brake lever to the strut of the brake beam.

The objects of the invention are:

First, to provide a single means or element of construction of the character above indicated which is capable of being easily and cheaply manufactured, and quickly applied or renewed with a minimum of labor and expense and at the same time insure the continuous and efficient operation of the brakes under all kinds of service and weather conditions.

Second, to provide a single element of construction having all the qualifications above pointed out and capable of being applied to all existing and similar types of brake beams and gearing without special tools or skilled labor in a minimum of time and without disturbing, or renewing, or changing the brake beams or their cooperating and connected brake applying gear.

Third, to provide a single element of construction in which the connections of said element with the strut, brake lever and the bottom or brake connecting rod mutually cooperate with each other to prevent said element from becoming disturbed, detached or in any way disarranged so as not to permit the braking mechanism to perform its desired functions and also eliminate the possibility of said bottom or brake connecting rod from becoming released and drop on the ties and road bed, thereby causing the brake rigging or gear to be destroyed and resulting in serious accidents.

Fourth, other advantages and objects of the invention will appear from the detailed description of the construction, arrangement, manner of applying and operation of the parts which will be hereinafter more fully described.

The invention consists of structural characteristics and relative arrangement of elements which will be presently more fully described and particularly pointed out in the appended claims.

In the drawings in which similar reference characters indicate the same parts in the several figures:

Figure 1 is a fragmentary side elevation partly in section of a brake beam and cooperating mechanism embodying the invention.

Figure 2 is a section on line II—II of Figure 1, with the brake hanger removed.

Figure 3 is a top plan and detached view of a modified form of the improved pin or single element for connecting the brake lever to the bottom or brake connecting rod, and strut of the brake beam.

Figure 4 is a side view of the modified form shown in Figure 3.

Figure 5 is a section taken on line V—V of Figure 4.

Figure 6 is a similar view as Figure 3 of another modification.

Figure 7 is a side elevation of the form illustrated in Figure 6.

Figure 8 is a view similar to Figure 3 of a further variation of construction.

Figure 9 is a side elevation of the form shown in Figure 8.

Figure 10 is a side elevation partly in section of a fragmentary view of a further modification.

Figure 11 is a section taken on line XI—XI of Figure 10.

Referring to Figures 1 and 2 of the drawings, 10 represents the compression member of a brake beam having secured at each of its ends a brake head 11 provided with a brake shoe 12, and the ends of said compression member 10 and brake beam are pivotally supported by a brake hanger 13 having its lower end pivotally attached to the brake head as is common in this class of railway brake appliances.

The outer ends of the compression member 10 are connected by the usual tension member 14 and between and intermediate the ends of the compression member 10 and tension member 14 is interposed a strut 15 preferably provided with a slot 16, and an opening 17 for purposes to be presently described.

Within said slot 16 of the strut 15 is inserted a brake lever 18 having at its ends an upper opening 19 and at its lower end an opening 20, and at its section between its end an opening 21.

22 is the lower or brake connecting rod having a bifurcated end at each of its ends provided with perforations or openings 23 as indicated.

24 is the improved element or member which is preferably U-shaped in form and is formed or provided with two interconnected sections or pins 25 and 26 so constructed, proportioned and arranged as to be adapted to have the end or pin 25 inserted into the registering openings 17 in the strut 15 and opening 21 of the brake lever 18 and the other end or pin 26 inserted into the registering openings 23 in the end of the lower or brake connecting rod 22 and opening 20 in the lower end of the brake lever, as clearly shown in Figure 2. The ends of the pins or sections 25 and 26 are provided with openings 27 to receive cotter pins 28 to retain the same in their inserted and assembled position and enable said U-shaped member 24 to be easily removed if so desired by an upwardly directed force applied to the interconnecting section, after said pins 28 are removed.

From the foregoing construction and arrangement of the U-shaped element or double pin 24 and cooperation of its ends or pins 25 and 26, with the brake lever 18, strut 15, and lower or brake connecting rod 22, it will be seen that said pins 25 and 26 are incapable of rotation thereby reducing the wear of the parts to a minimum and also preventing the cotter pins 28 from dropping out of these openings 27 for the reason that they are always in an upright position. Furthermore, if the lower cotter pin 28 engaging pin 26 should be accidentally distorted, displaced or lost due to coming in contact with obstructions, such as ice or snow on the road bed and finally drop out, the upper cotter pin 28 of pin 25 will remain to firmly and securely hold the double pin or element 24 in its proper position to sustain all the parts of the brake beam and rigging in operative relations, and said double pin or element 24 will remain in position although both upper and lower cotter pins 28 are removed for the reason that said ends or pins 25 and 26 are incapable of working out, as they are non-rotatable, and mutually cooperate to hold each other in their respective openings.

Figures 3, 4 and 5 illustrate a modified form of the U-shaped member or element 24 shown in Figure 1 and depicts two sections 30 and 31 which are adjustable with respect to each other by a means of slots 32 and 33 and pin 34 connection, whereby the distance between their pins or ends may be varied to adapt the same to be inserted in brake levers 18 of different length, in which the distance between the openings 20 and 21 may vary.

The modification of the double pins shown in Figures 6 and 7 is of the same general construction and adjustable as that illustrated in Figures 3, 4 and 5, except the two slidable sections 35 and 36 have outwardly turned ends 37 and 38 which act as stops or retainers when the inner ends of said sections 35 and 36 are slid or adjusted through the encircling band 39 as will be readily understood and needs no further disclosure.

Figures 8 and 9 illustrate a double pin made from a single piece as described with reference to Figures 1 and 2, except that the section interconnecting the ends or pieces is flattened out as shown at 40 to permit a slight flexing or lateral movement of pins with respect to each other should the registering openings for their insertion not be in proper alinement with each other.

Figures 10 and 11 show a modification in which two U-shaped double pins 41 and 42 of half round section are employed and inserted from the opposite sides of the strut 18 and bottom rod 22 which may be held together if so desired by either cotter pins 43 or bent ends 44 as indicated, or both if so desired.

From the foregoing disclosure of the construction, arrangement and manner of assembling and operation of the device, it will be seen that all of the objects and advantages recited in the statement of invention have been fully and efficiently carried out, and while I have shown the preferred forms or modifications of carrying out the invention, many other and similar expedients will readily suggest themselves without in any way departing from the present invention, as for example, it is not absolutely necessary that the double pin or single element 24 be U-shaped, as shown, but it may be of any other configuration or shape, so long as the pins or its cooperating ends are interconnected, and the brake lever 18 may be pivoted to the strut 15 without passing through a slot 16 as disclosed if so desired.

What I claim is:—

1. A brake construction comprising a brake beam having a compression member and a tension member, a strut cooperating with said compression and tension members, a brake lever, a bottom or brake connecting rod, and an interconnected double pin having one of its pins connecting the brake lever to said strut member and its other pin connecting said brake lever to said bottom or brake connecting rod.

2. A brake construction comprising a brake beam having a compression member and a tension member, a strut interposed between and intermediate the ends of said compression and tension members, a brake lever, a bottom or brake connecting rod, and a member provided with two interconnected pins and having one of its pins pivotally connecting the brake lever between its ends to said strut member and its other pin connecting an end of said brake lever with an end of said bottom or brake connecting rod.

3. A brake construction comprising a brake beam having a compression member and a tension member, a strut having a slot and interposed between and intermediate the ends of said compression and tension members, a brake lever within said slot of the strut, a bottom or brake connecting rod, and a member provided with two interconnected pins and having one of its pins pivotally connecting the brake lever between its ends to said strut member and its other pin connecting an end of said brake lever with an end of said bottom or brake connecting rod.

4. A brake construction comprising a brake beam having a compression member and a tension member, a strut cooperating with said compression and tension members, a brake lever, a bottom or brake connecting rod, and a longitudinally adjustable interconnected double pin having one of its pins connecting the brake lever between its ends to said strut member and its other pin connecting said brake lever to an end of said bottom or brake connecting rod.

5. A brake construction comprising a brake beam having a compression member and a tension member, a strut cooperating with said compression and tension members, a brake lever, a bottom or brake connecting rod, and an adjustable inter-connected double pin having one of its pins connecting the brake lever between its ends to said strut member and its other pin connecting said brake lever to an end of said bottom or brake connecting rod.

6. A brake construction comprising a brake beam having a compression member and a tension member, a strut having a slot and interposed between and intermediate the ends of said compression and tension members, a brake lever within said slot of the strut, a bottom or brake connecting rod, and a U-shaped member having one of its ends pivotally connecting the brake lever between its ends to said strut member and the other end of said U-shaped member connecting an end of said brake lever to an end of said bottom or brake connecting rod.

7. A brake construction comprising a brake beam having a compression member and a tension member, a strut having a slot and interposed between and intermediate the ends of said compression and tension members, a brake lever within said slot of the strut, a bottom or brake connecting rod, and a U-shaped member provided with adjustable ends and having one of its ends pivotally connecting the brake lever between its ends to said strut member and the other end of said U-shaped member connecting an end of said brake lever to an end of said bottom or brake connecting rod.

In testimony whereof I affix my signature.

BRODERICK HASKELL.